US012047011B2

(12) United States Patent
Smith et al.

(10) Patent No.: US 12,047,011 B2
(45) Date of Patent: Jul. 23, 2024

(54) GATE DRIVER CIRCUIT FOR A SYNCHRONOUS RECTIFIER OF A WIRELESS POWER RECEIVER SYSTEM

(71) Applicant: Cypress Semiconductor Corporation, San Jose, CA (US)

(72) Inventors: Nicholaus Smith, San Diego, CA (US); Arun Khamesra, Bangalore Karnataka (IN); Prasanna Venkateswaran Vijayakumar, Bangalore (IN)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 0 days.

(21) Appl. No.: 17/741,936

(22) Filed: May 11, 2022

(65) Prior Publication Data

US 2023/0253893 A1 Aug. 10, 2023

Related U.S. Application Data

(60) Provisional application No. 63/308,737, filed on Feb. 10, 2022.

(51) Int. Cl.
*H02M 7/217* (2006.01)
*H02J 50/12* (2016.01)
(Continued)

(52) U.S. Cl.
CPC ............. *H02M 7/217* (2013.01); *H02J 50/12* (2016.02); *H02M 1/0009* (2021.05); *H02M 1/0012* (2021.05); *H02M 1/08* (2013.01)

(58) Field of Classification Search
CPC .................................................. H02M 7/217
See application file for complete search history.

(56) References Cited

U.S. PATENT DOCUMENTS 4,556,882 A * 12/1985 Brifman ............ H02J 13/00034
340/638
6,657,914 B1 * 12/2003 Ong ........................ G11C 8/10
365/230.06
(Continued)

OTHER PUBLICATIONS

"High Voltage Synchronous N-Channel MOSFET Driver", Linear Technology, LTC4444-5, pp. 1-14.
(Continued)

*Primary Examiner* — Adi Amrany
(74) *Attorney, Agent, or Firm* — Murphy, Bilak & Homiller, PLLC

(57) ABSTRACT

A gate driver circuit for a synchronous rectifier (SR) of a wireless power receiver (WPR) system includes: a first RC filter that outputs a delayed turn-on signal for a first high-side SR switch based on a signal input to the filter that indicates a zero-crossing condition for a coil current of the WPR system in a first direction; a second RC filter that outputs a delayed turn-on signal for a second high-side SR switch based on a signal input to the filter that indicates a zero-crossing condition for the coil current in the opposite direction; a first digital delay-and-hold circuit electrically connected to the output of the first RC filter and that stabilizes the delayed turn-on signal output by the first filter; and a second digital delay-and-hold circuit electrically connected to the output of the second RC filter and that stabilizes the delayed turn-on signal output by the second filter.

13 Claims, 5 Drawing Sheets

(51) Int. Cl.
*H02M 1/00* (2006.01)
*H02M 1/08* (2006.01)

(56) References Cited

U.S. PATENT DOCUMENTS

| | | | |
|---|---|---|---|
| 2003/0231539 A1* | 12/2003 | Lee | G11C 7/04 |
| | | | 365/205 |
| 2017/0104409 A1* | 4/2017 | Cohen | H02M 1/10 |
| 2017/0179823 A1* | 6/2017 | Dash | H02M 3/158 |
| 2022/0103165 A1* | 3/2022 | Bliem | H03K 5/1252 |

OTHER PUBLICATIONS

"Power delivery microcontroller Gen1", Infineon Datasheet, Nov. 27, 2021, pp. 1-64.

"Reverse Current Protection Using MOSFET and Comparator to Minimize Power Dissipation", Texas Instruments, Application Report, SNOA971, Feb. 2018, pp. 1-11.

* cited by examiner

GATE DRIVER CIRCUIT FOR A SYNCHRONOUS RECTIFIER OF A WIRELESS POWER RECEIVER SYSTEM

BACKGROUND

Wireless charging stations are used to charge batteries in mobile devices without wires, as such they typically have variable load levels that may range anywhere from OW (no load) up to 50 W for high-speed charging applications. To span such a large potential power range, a flexible input from the receiver coil is needed in terms of operating frequency, duty cycle, and voltage level. Furthermore, the rectifier should operate with the MOSFETs (metal-oxide-semiconductor field-effect transistors) in saturated commutation mode for as much of the period as possible to maximize efficiency. The monitoring and gate driver signals require complex timers, blanking, and other analog and digital circuitry for sensing the incoming current and turning off and turning on the rectifier MOSFETs such that the MOSFETs turn on and off with minimal voltage from drain to source and when the current is not rapidly changing or is at 0 A value.

Typically, these circuits are designed and integrated and require complicated state machine and controls to achieve synchronous switching action and prevent shoot-through or short circuit conditions which can increase system losses and increase design complexity, which increases design time and cost. Simply using comparators to monitor for zero voltage crossing or rectified voltage crossovers is possible to detect the proper timing. However, such solutions tend to create noise as the MOSFETs being turned on can cause oscillations.

Also, allowing the MOSFETs to remain on when the coil current reverses can cause an AC node to be forced high or low. If the alternate MOSFET is still on, the result is a voltage rectification short circuit and very high currents flow and damage or disconnections are possible.

Thus, there is a need for an improved rectification technique for a wireless power receiver system.

SUMMARY

According to an embodiment of a gate driver circuit for a synchronous rectifier of a wireless power receiver system, the gate driver circuit comprises: a first RC filter configured to output a delayed turn-on signal for a first high-side switch of the synchronous rectifier based on a signal input to the first RC filter that indicates a zero-crossing condition for a coil current of the wireless power receiver system in a first direction; a second RC filter configured to output a delayed turn-on signal for a second high-side switch of the synchronous rectifier based on a signal input to the second RC filter that indicates a zero-crossing condition for the coil current in a second direction opposite to the first direction; a first digital delay-and-hold circuit electrically connected to the output of the first RC filter and configured to stabilize the delayed turn-on signal output by the first RC filter; and a second digital delay-and-hold circuit electrically connected to the output of the second RC filter and configured to stabilize the delayed turn-on signal output by the second RC filter.

According to an embodiment of a wireless power receiver system, the wireless power receiver system comprises: a coil configured to conduct a current during inductive power coupling; a synchronous rectifier configured to rectify power received at the coil; and a gate driver circuit configured to control switching of the synchronous rectifier, wherein the gate driver circuit comprises: a first RC filter configured to output a delayed turn-on signal for a first high-side switch of the synchronous rectifier based on a signal input to the first RC filter that indicates a zero-crossing condition for the coil current in a first direction; a second RC filter configured to output a delayed turn-on signal for a second high-side switch of the synchronous rectifier based on a signal input to the second RC filter that indicates a zero-crossing condition for the coil current in a second direction opposite the first direction; a first digital delay-and-hold circuit electrically connected to the output of the first RC filter and configured to stabilize the delayed turn-on signal output by the first RC filter; and a second digital delay-and-hold circuit electrically connected to the output of the second RC filter and configured to stabilize the delayed turn-on signal output by the second RC filter.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide an improved rectification technique for a wireless power receiver system. The improved rectification technique is self-driven and uses the incoming AC voltages, coil current, and reverse current protection (RCP) comparators for driving a synchronous rectifier of the wireless power receiver system. RC filters adjust the deadtime of the synchronous rectifier. Programmable resistor and/or capacitor elements may be used to adjust the turn-on delay timing. The use of reverse current protection comparators turns off fast the synchronous rectifier MOSFETs when the coil current derivative approaches zero. Adding programmable or variable input offset to the reverse current protection comparators may be used to adjust the turn-off timing.

Described next, with reference to the figures, are exemplary embodiments of a wireless power receiver system and a gate driver circuit for a synchronous rectifier of the wireless power receiver system.

Figure 1:
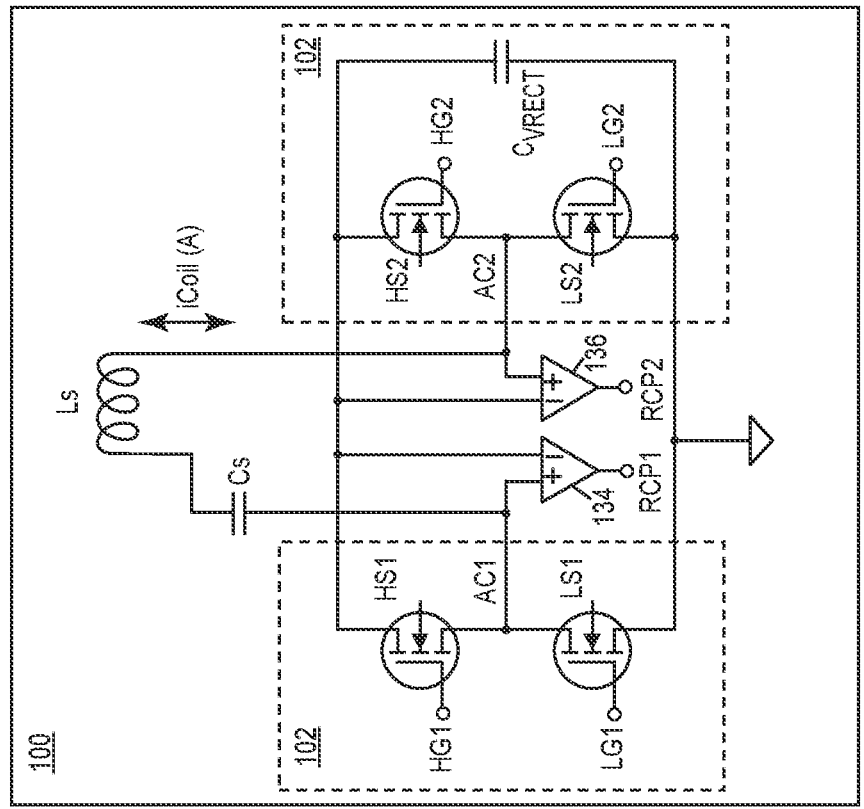
FIG. 1 illustrates a schematic diagram of an embodiment of a wireless power receiver system that includes a synchronous rectifier and a gate driver circuit for the synchronous rectifier.
Figure 1:
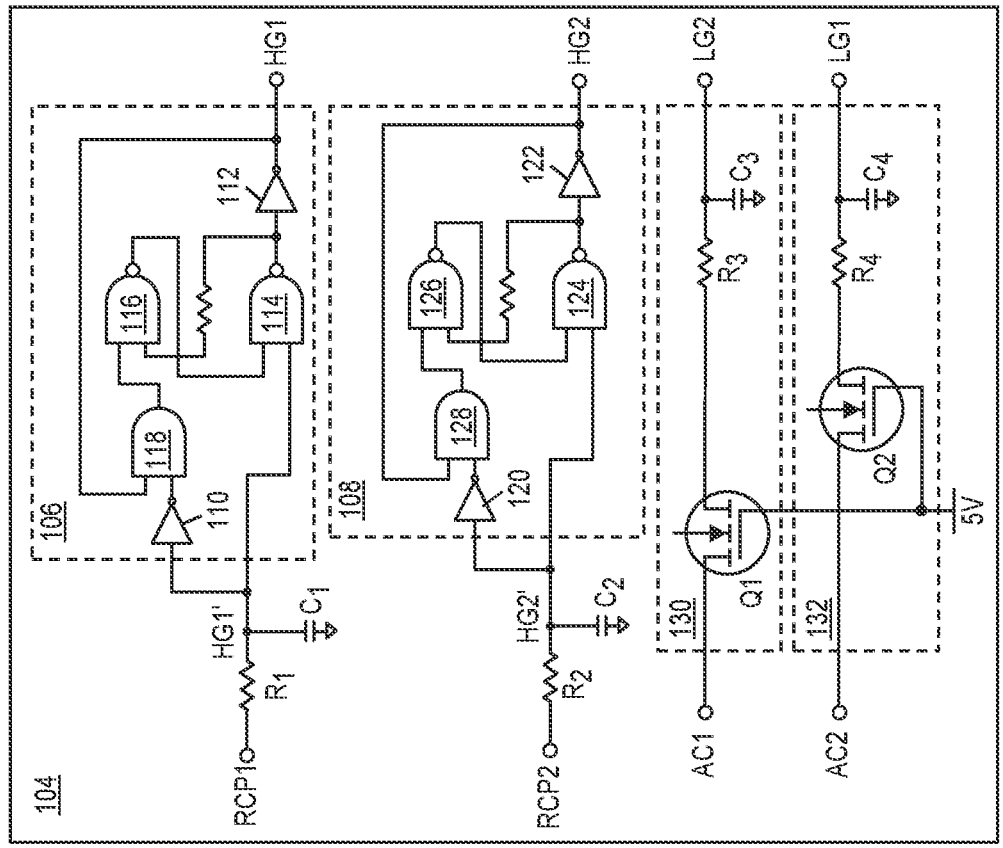
Figure 2:
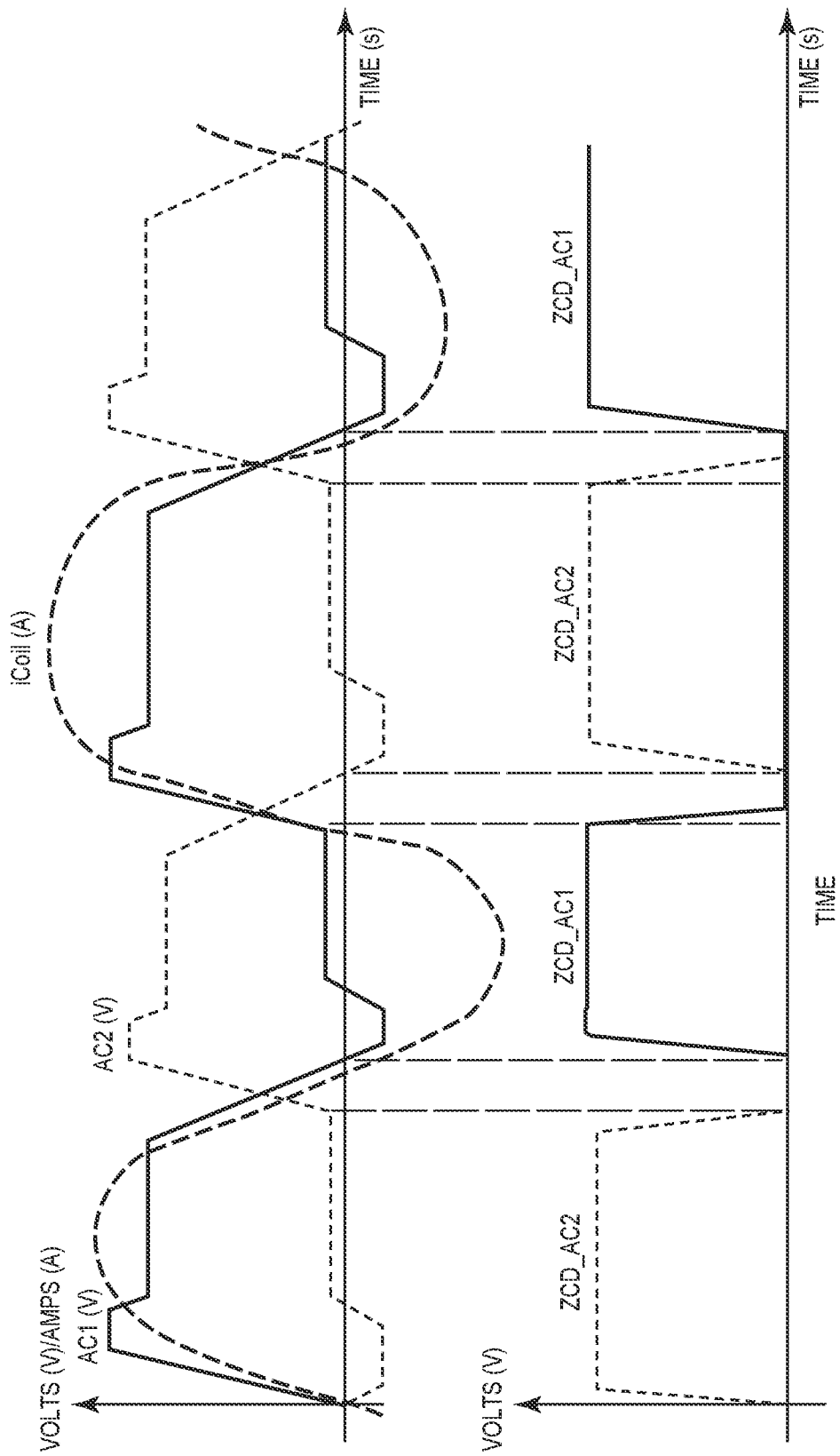
FIG. 2 illustrates various waveforms associated with the operation of the wireless power receiver system.

FIG. 1 illustrates an embodiment of a wireless power receiver system 100 that includes a synchronous rectifier 102 and a gate driver circuit 104 for the synchronous rectifier 102. FIG. 2 illustrates various waveforms associated with the operation of the wireless power receiver system 100.

Power is wirelessly transferred via electromagnetic waves to the wireless power receiver system 100. An electromagnetic field arises when a coil Ls of the wireless power receiver system 100 is placed in proximity of a coil included in a wireless power transmitter (not shown). The electromagnetic field allows power to pass from the transmitter coil to the receiver coil Ls. The receiver coil Ls conducts a current iCoil during inductive power coupling. The gate driver circuit 104 controls switching of the synchronous rectifier 102 such that the synchronous rectifier 102 converts the coil current iCoil to a DC signal, e.g., to charge a battery and/or power circuitry included in or coupled to the wireless power receiver system 100. More than one coil may be used on the transmit and/or receive sides.

The gate driver circuit 104 for the synchronous rectifier 102 of the wireless power receiver system 100 includes a first RC filter formed by a first resistor R1 and a first capacitor C1, and a second RC filter formed by a second resistor R2 and a second capacitor C2. The first RC filter R1/C1 outputs a delayed turn-on signal HG1' for a first high-side (HS) switch HS1 of the synchronous rectifier 102 based on a signal RCP1 input to the first RC filter R1/C1 that indicates a zero-crossing condition 'ZCD_AC1' for the coil current iCoil of the wireless power receiver system 100 in a first direction. The second RC filter R2/C2 similarly outputs a delayed turn-on signal HG2' for a second high-side switch HS2 of the synchronous rectifier 102 based on a signal RCP2 input to the second RC filter R2/C2 that indicates a zero-crossing condition 'ZCD_AC2' for the coil current iCoil in a second direction opposite to the first direction. The RC filters R1/C1, R2/C2 adjust the deadtime (turn-on delay) of the synchronous rectifier 102. The resistor and/or capacitor elements R1, R2, C1, C2 of the RC filters R1/C1, R2/C2 may be programmable to adjust the turn-on delay timing.

The zero-crossing condition ZCD_AC1 in FIG. 2 indicates when the voltage at node AC1 between the first high-side switch HS1 and a first low-side switch LS1 of the synchronous rectifier 102 approaches zero. The zero-crossing condition ZCD_AC2 in FIG. 2 likewise indicates when the voltage at node AC2 between the second high-side switch HS2 and a second low-side switch LS2 of the synchronous rectifier 102 approaches zero.

The gate driver circuit 104 for the synchronous rectifier 102 of the wireless power receiver system 100 also includes a first digital delay-and-hold circuit 106 and a second digital delay-and-hold circuit 108. The first digital delay-and-hold circuit 106 is electrically connected to the output of the first RC filter R1/C1 and stabilizes the delayed turn-on signal HG1' output by the first RC filter R1/C1. The stabilized signal HG1 provided by the first digital delay-and-hold circuit 106 drives the gate of the first high-side switch HS1 of the synchronous rectifier 102. The second digital delay-and-hold circuit 108 is electrically connected to the output of the second RC filter R2/C2 and similarly stabilizes the delayed turn-on signal HG2' output by the second RC filter R2/C2. The stabilized signal HG2 provided by the second digital delay-and-hold circuit 108 drives the gate of the second high-side switch HS2 of the synchronous rectifier 102.

The first digital delay-and-hold circuit 106 captures and holds the delayed turn-on signal HG1' output by the first RC filter R1/C1 at a steady level such that the first high-side switch HS1 of the synchronous rectifier 102 remains on during inductive power coupling to the receiver coil Ls at a first polarity. The second digital delay-and-hold circuit 108 similarly captures and holds the delayed turn-on signal HG2' output by the second RC filter R2/C2 at a steady level such that the second high-side switch HS2 of the synchronous rectifier 102 remains on during inductive power coupling to the receiver coil Ls at the opposite polarity. Accordingly, the first and second digital delay-and-hold circuits 106, 108 may be considered to have a latch-like function.

According to the embodiment illustrated in FIG. 1, the first and second digital delay-and-hold circuits 106, 108 are implemented as logic gates. The first digital delay-and-hold circuit 106 includes a first NOT gate 110, a second NOT gate 112, a first NAND gate 114, a second NAND gate 116, and an AND gate 118. The input of the first NOT gate 110 is electrically connected to the output of the first RC filter R1/C1. The input of the second NOT gate 112 is electrically connected to the output of the first NAND gate 114. A first input of the AND gate 118 is electrically connected to the output of the first NOT gate 110. A second input of the AND gate 118 is electrically connected to the output of the second NOT gate 112. A first input of the first NAND gate 114 is electrically connected to the output of the first RC filter R1/C1. A second input of the first NAND gate 114 is electrically connected to the output of the second NAND gate 116. A first input of the second NAND gate 116 is electrically connected to the output of the AND gate 118. A second input of the second NAND gate 116 is electrically connected to the output of the first NAND gate 114. The output of the second NOT gate 112 outputs a stabilized version HG1 of the delayed turn-on signal HG1' output by the first RC filter R1/C1, for driving the gate of the first high-side switch HS1 of the synchronous rectifier 102.

The second digital delay-and-hold circuit 108 of the gate driver circuit 104 similarly includes a first NOT gate 120, a second NOT gate 122, a first NAND gate 124, a second NAND gate 126, and an AND gate 128. The input of the first NOT gate 120 is electrically connected to the output of the second RC filter R2/C2. The input of the second NOT gate 122 is electrically connected to the output of the first NAND gate 124. A first input of the AND gate 128 is electrically connected to the output of the first NOT gate 120. A second input of the AND gate 128 is electrically connected to the output of the second NOT gate 122. A first input of the first NAND gate 124 is electrically connected to the output of the second RC filter R2/C2. A second input of the first NAND gate 124 is electrically connected to the output of the second NAND gate 126. A first input of the second NAND gate 126 is electrically connected to the output of the AND gate 128. A second input of the second NAND gate 126 is electrically connected to the output of the first NAND gate 124. The output of the second NOT gate 122 outputs a stabilized version HG2 of the delayed turn-on signal HG2' output by the second RC filter R2/C2, for driving the gate of the second high-side switch HS2 of the synchronous rectifier 102.

For driving the low-side switches LS1, LS2 of the synchronous rectifier 102, the gate driver circuit 104 includes a first level shifter circuit 130 and a second level shifter circuit 132. The first level shifter circuit 130 outputs a gate signal LG2 for a second low-side (LS) switch LS2 of the synchronous rectifier 102 based on a voltage at the AC1 node between the first high-side switch HS1 and a first low-side switch LS1 of the synchronous rectifier 102, such that the second low-side switch LS2 and the first high-side switch HS1 are both on or off at the same time.

The second level shifter circuit 132 similarly outputs a gate signal LG1 for the first low-side switch LS1 of the synchronous rectifier 102 based on a voltage at the AC2 node between the second high-side switch HS2 and the second low-side switch LS2 of the synchronous rectifier 102, such that the first low-side switch LS1 and the second high-side switch HS2 are both on or off at the same time. Such switch control for the synchronous rectifier 102 ensures proper rectification of the electromagnetic energy received by the coil Ls of the wireless power receiver system 100 in either direction of the coil current iCoil.

According to the embodiment illustrated in FIG. 1, the first level shifter circuit 130 includes a first transistor device Q1 such as a MOSFET electrically connected between the AC1 node and the input of an RC filter R3/C3. The gate of the second low-side switch LS2 is electrically connected to the output of the RC filter R3/C3. The second level shifter circuit 132 similarly includes a second transistor device Q2 electrically connected between the AC2 node and the input of an RC filter R4/C4. The gate of the first low-side switch LS1 is electrically connected to the output of the RC filter R4/C4 of the second level shifter circuit 132. The gate of the first level-shifter transistor device Q1 and the gate of the second level-shifter transistor device Q2 may be electrically connected to the same DC voltage, e.g., 5V in FIG. 1.

The voltages at the AC1 and AC2 nodes are the main incoming waveforms to the synchronous rectifier 102 and have a square wave-like form as shown in FIG. 2. The level-shifter transistor devices Q1, Q2 translate the AC1, AC2 waveforms, respectively, to 5V (in FIG. 1) or any other suitable voltage. The level shifter circuits 130, 132 implement slow turn on and fast turn off for low-side tracking of the opposite AC1/AC2 node.

According to the embodiment illustrated in FIG. 1, the wireless power receiver system 100 includes a resonant capacitor Cs having a first terminal electrically connected to the AC1 node and a second terminal electrically connected to a first end of the receiver coil Ls. The AC2 node is electrically connected to a second end of the coil Ls of the wireless power receiver system 100. The synchronous rectifier 102 may include a storage capacitor $C_{VRECT}$ for minimizing output voltage ripple. Due to symmetry, the connections from AC1 and AC2 nodes to the receiver coil Ls and resonant capacitor Cs may be reversed.

When the slope of the voltage at the AC1 node or the AC2 node changes, the voltage reaches zero which means the current direction is about to change. A corresponding RCP (reverse current protection) comparator 134, 136 is triggered to indicate a ZVS (zero-voltage switching) condition to the corresponding high-side RC filter R1/C1, R2/C2. The triggered comparator output causes the corresponding digital delay-and-hold circuit 106/108 to turn on the corresponding high-side synchronous rectifier switch HS1/HS2 after some delay, as explained above. Due to the coil current iCoil eventually reversing, the next falling edge of the voltage at the AC1/AC2 node turns the corresponding gate drive signal back off. Programmable or variable input offset may be added to the RCP comparators 134, 136 to adjust the turn-off timing.

Figure 3:
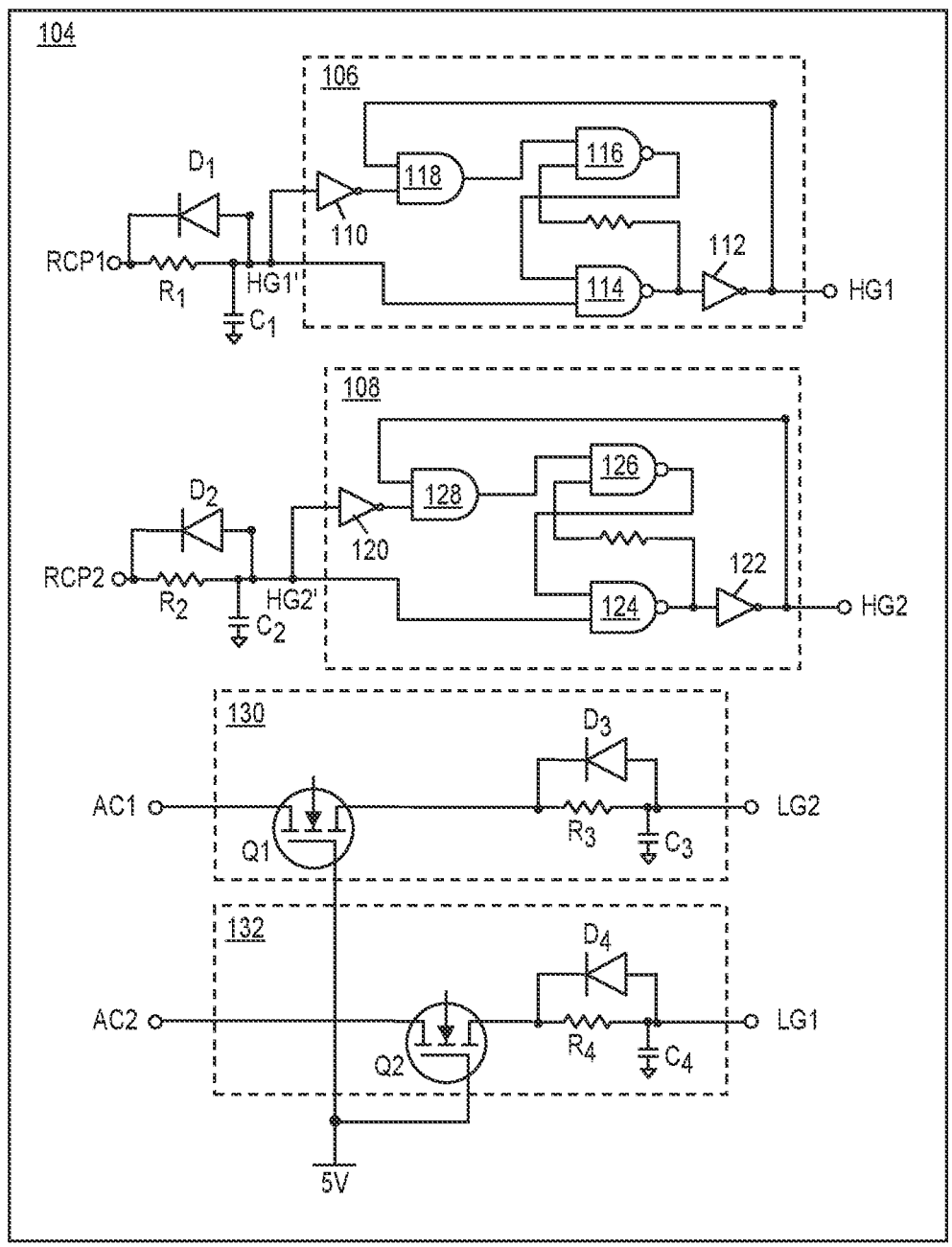
FIG. 3 illustrates a schematic diagram of another embodiment of a wireless power receiver.

FIG. 3 illustrates another embodiment of the wireless power receiver system 100. According to this embodiment, the high side part of the gate driver circuit 104 also includes a first diode D1 having an anode electrically connected to the output of the RC filter R1/C1 coupled to the first digital delay-and-hold circuit 106 and a cathode electrically connected to the input of the RC filter R1/C1. The high side part of the gate driver circuit 104 further includes a second diode D2 having an anode electrically connected to the output of the RC filter R2/C2 coupled to the second digital delay-and-hold circuit 108 and a cathode electrically connected to the input of the RC filter R2/C2. The diodes D1, D2 do not delay turn on of the corresponding high-side synchronous rectifier switch HS1, HS2 but shorten the switch turn off by effectively shunting the respective series resistor R1, R2.

The low side part of the gate driver circuit 104 may similarly include a third diode D3 having an anode electrically connected to the output of the RC filter R3/C3 of the first level shifter circuit 130 and a cathode electrically connected to the input of the RC filter R3/C3. The second level shifter circuit 132 similarly may include a fourth diode D4 having an anode electrically connected to the output of the RC filter R4/C4 of the second level shifter circuit 132 and a cathode electrically connected to the input of the RC filter R4/C4. Like the diodes D1, D2 on the high side of the gate driver circuit 104, the diodes D3, D4 on the low side have little effect on the turn on delay of the corresponding low-side synchronous rectifier switch LS1, LS2 but shorten the switch turn off by effectively shunting the respective series resistor R3, R4.

The rectifier storage capacitor $C_{VRECT}$ stores a fair amount of energy and is directly tied to the high-side synchronous rectifier switches HS1, HS2. If either high-side synchronous rectifier switch HS1, HS2 misfires, a serious short circuit condition could occur. The RC filters R1/C1, R2/C2 on the high side part of the gate driver circuit 104 adjust the dead times/delays for the respective high-side synchronous rectifier switch HS1, HS2, to ensure safe operation. The low-side synchronous rectifier switches LS1, LS2 do not have a direct connection to the rectifier storage capacitor $C_{VRECT}$ and instead are effectively protected by the high-side synchronous rectifier switches HS1, HS2.

As explained above, a pulse from the respective RCP comparator 134, 136 triggers the corresponding digital delay-and-hold circuit 106, 108 which turns on the corresponding high-side synchronous rectifier switch HS1/HS2. The next falling edge of the AC1/AC2 signal, due to the coil current iCoil reversing, turns the gate drive signal back off. Each RC filter R1/C1, R2/C2 on the high side part of the gate driver circuit 104 holds the corresponding RCP signal output RCP1, RCP2 to a stable value, similar to the function of an SR latch. These RC filters R1/C1, R2/C2 therefore provide both dead-time and RCP signal stabilization.

The digital delay-and-hold circuits 106, 108 force a digital delay based on the corresponding RC filter R1/C1, R2/C2 and address filter glitch whereas the filters R1/C1, R2/C2 provide the dead time control. When the slope of the AC signal at node AC1 or AC2 becomes positive, the corresponding RC filter R1/C1, R2/C2 delays how long to trigger (dead time) the corresponding high-side synchronous rectifier switch HS1/HS2. The dead time is longer than propagation delay, because of the RC filters R1/C1, R2/C2, which in turn delays the high-side switch gates from turning on to allow time for diodes D1, D2 to remain on and prevent erroneous current flow. Otherwise, if the current goes in the wrong direction, the synchronous rectifier 102 may oscillate uncontrollably and cause a short circuit condition. The RC filters R1/C1, R2/C2, diodes D1, D2, and digital delay-and-hold circuits 106, 108 on the high side part of the gate driver circuit 104 enable delayed on time with quick turn off when the coil current iCoil reverses direction.

Figure 4:
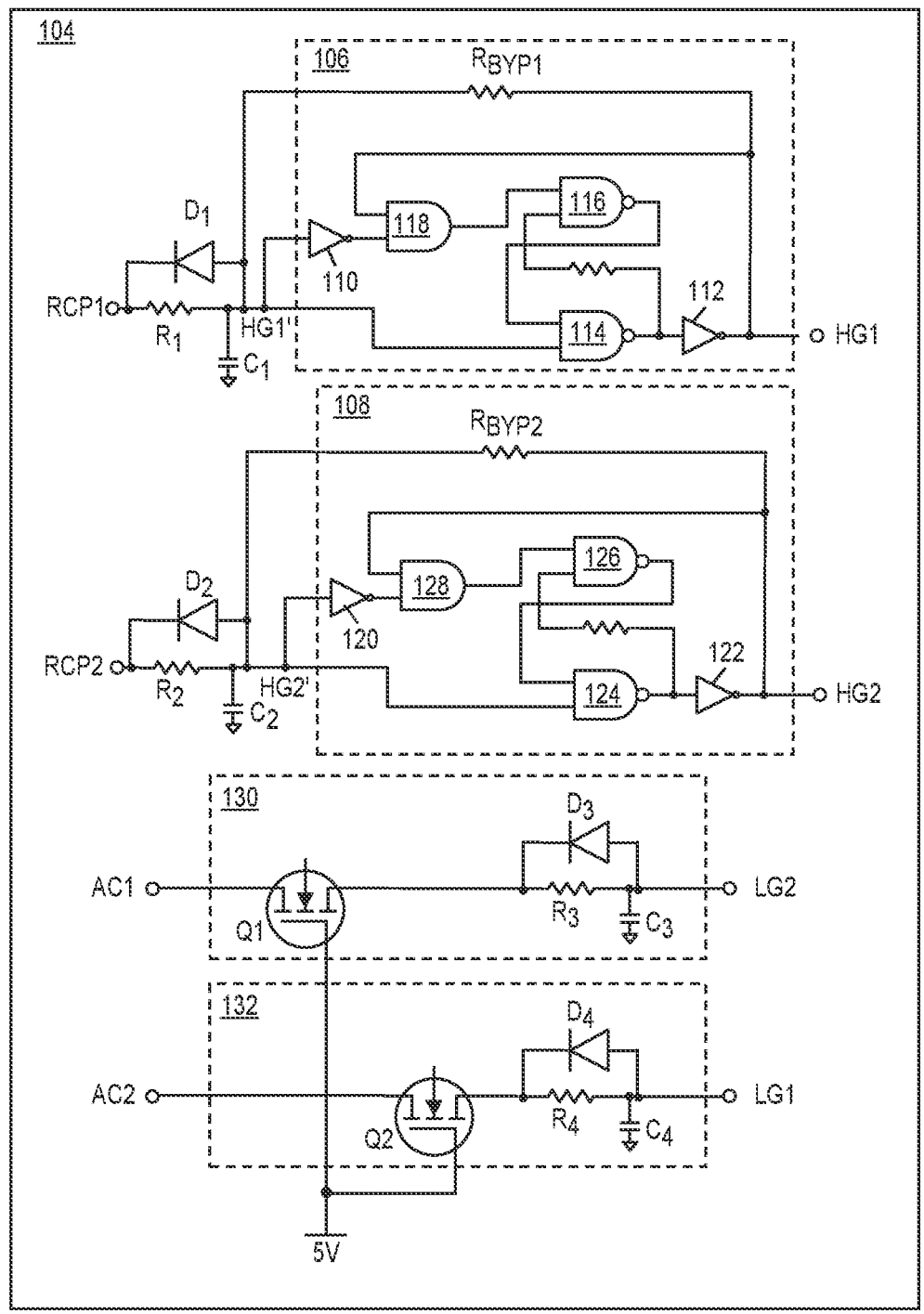
FIG. 4 illustrates a schematic diagram of another embodiment of a wireless power receiver.

FIG. 4 illustrates another embodiment of the wireless power receiver system 100. The embodiment shown in FIG. 4 is similar to the embodiment shown in FIG. 3. In FIG. 4, the first digital delay-and-hold circuit 106 of the gate driver circuit 104 also includes a resistor $R_{BYP1}$ that electrically connects the output of the RC filter R1/C1 to the output of the second NOT gate 112 of the first digital delay-and-hold circuit 106. The second digital delay-and-hold circuit 108 similarly includes a resistor $R_{BYP2}$ that electrically connects the output of the RC filter R2/C2 to the output of the second NOT gate 122 of the second digital delay-and-hold circuit 108. The resistors $R_{BYP1}$, $R_{BYP2}$ may be used to bypass the respective digital delay-and-hold circuits 106, 108 for a particular application or in the event the noise from switching does not interfere with the RCP comparators zero current detection.

Figure 5:
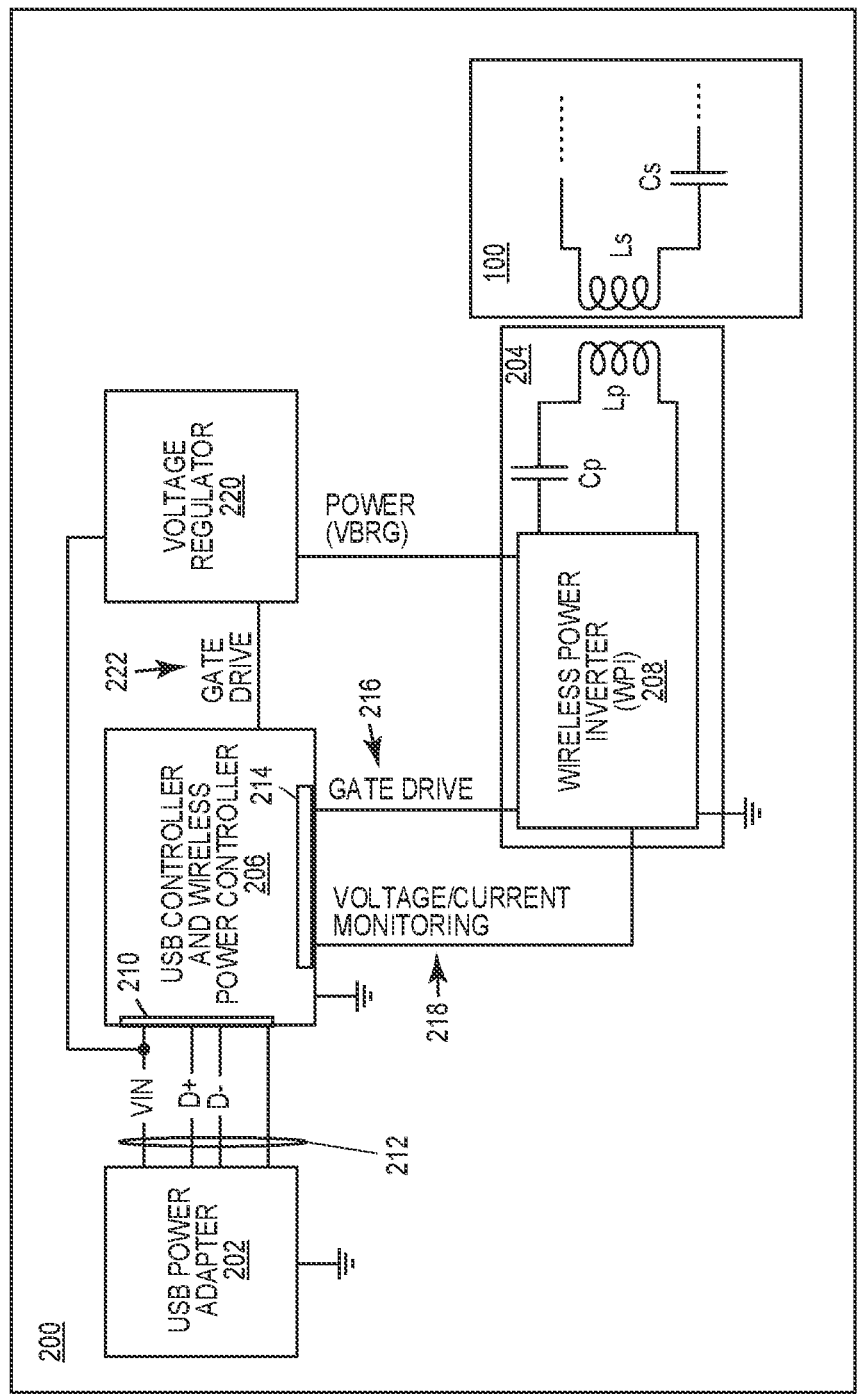
FIG. 5 illustrates a block diagram of an embodiment of a wireless charging system that includes the wireless power receiver system, a Universal Serial Bus (USB) power adaptor, a wireless charging station, and a controller.

FIG. 5 illustrates an embodiment of a wireless charging system 200 that includes the wireless power receiver system 100, a Universal Serial Bus (USB) power adaptor 202, a wireless charging station 204, and a controller 206. The USB power adaptor 202 interfaces with a power source such as AC mains and outputs a voltage 'VIN' based on the power source. The USB power adaptor 202 may be compliant with the USB-PD (USB-Power Delivery) specification, USB-C specification, PPS (Programmable Power Supply) specification, etc. In general, the voltage VIN output by the USB power adaptor 202 may have relatively small output voltage steps, e.g., every 20 mV, 40 mV, 100 mV, etc., or larger steps, e.g., 5V, 12V and 15V.

The wireless charging station 204 wirelessly charges the wireless power receiver system 100 which may be a cellular phone, smartphone, PDA (personal digital assistant), PDA phone, etc. in charging proximity of the wireless charging station 204. The wireless charging station 204 may be integrated in a charging pad and include a Wireless Power Inverter (WPI) 208 for wirelessly transferring power via magnetic induction to charge a battery included in the wireless power receiver system 100. The WPI 208 may be a full-bridge or half-bridge inverter having voltage 'VBRG' as a DC input voltage, for example.

The wireless charging station 204 includes an induction coil Lp placed in a series resonant circuit with a capacitor Cp to yield a resonant circuit with a natural resonance when coupled to the corresponding coil Ls of the wireless power receiver system 100. Proximity of the coils Lp, Ls allows an electromagnetic field to be created. This electromagnetic field allows power to pass from the transmitter coil Lp to the receiver coil Ls. The induction coil Ls in the wireless power receiver system 100 uses the transferred power to charge a battery and/or power circuitry included in or coupled to the wireless power receiver system 100. More than one coil may be used on the transmit and receive sides.

The same controller 206 is used to control both the wireless charging station 204 and the USB power adaptor 202. The controller 206 includes a first USB port 210 for coupling the controller 206 to the USB power adaptor 202 over a USB cable 212. The controller 206 may control the USB power adaptor 202 via D+ and D− data pins on the USB power adaptor 202.

The controller 206 also includes a second port 214 for coupling the controller 206 to the wireless charging station 204. The controller 206 may control the wireless charging station 204 via a gate drive signal 216 provided to the WPI 208 of the wireless charging station 204. For example, the gate drive signal 216 may be a PWM (pulse width modulation) signal provided to a gate driver of the WPI 208 for controlling the gates of power transistors that form a full-bridge or half-bridge inverter of the WPI 208. The controller 206 may control the wireless charging station 204 based on voltage and/or current information 218 received from the wireless charging station 204.

The controller 206 also controls the level of the voltage VIN output by the USB power adaptor 202 and the output power level of the wireless charging station 204. The input voltage 'VBRG' of the wireless charging station 204 corresponds to the voltage VIN output by the USB power adaptor 202 or is derived from the voltage VIN output by the USB power adaptor 202. As explained above, the USB power adaptor output voltage VIN may have relatively small voltage steps, e.g., every 20 mV, 40 mV, 100 mV, etc. If the degree of voltage control available at the USB power adaptor 202 is sufficient to implement the full output power range of the wireless charging station 204, the USB power adaptor output voltage VIN may be input directly as the wireless charging station input voltage VBRG and the controller 206 may control the output power level of the wireless charging station 204 by changing the level of VIN and/or the operating frequency or duty cycle of the wireless charging station 204. If more granular voltage level control is needed to implement the full output power range of the wireless charging station 204, the wireless charging system 200 may also include a voltage regulator 220 such as a DC/DC switching regulator such as a buck regulator or other type of step-down converter for regulating the input voltage VBRG of the wireless charging station 204 based on the voltage VIN output by the USB power adaptor 202. In this case, the controller 206 also controls the voltage regulator 220, e.g., via a gate drive signal 222 such as a PWM signal for controlling power transistors of the voltage regulator 220.

In either case, power is wirelessly transmitted from the wireless charging station 204 to the wireless power receiver system 100. The wireless power receiver system 100 implements the rectification technique described herein.

Although the present disclosure is not so limited, the following numbered examples demonstrate one or more aspects of the disclosure.

Example 1. A gate driver circuit for a synchronous rectifier of a wireless power receiver system, the gate driver circuit comprising: a first RC filter configured to output a delayed turn-on signal for a first high-side switch of the synchronous rectifier based on a signal input to the first RC filter that indicates a zero-crossing condition for a coil current of the wireless power receiver system in a first direction; a second RC filter configured to output a delayed turn-on signal for a second high-side switch of the synchronous rectifier based on a signal input to the second RC filter that indicates a zero-crossing condition for the coil current in a second direction opposite to the first direction; a first digital delay-and-hold circuit electrically connected to the output of the first RC filter and configured to stabilize the delayed turn-on signal output by the first RC filter; and a second digital delay-and-hold circuit electrically connected to the output of the second RC filter and configured to stabilize the delayed turn-on signal output by the second RC filter.

Example 2. The gate driver circuit of example 1, wherein the first digital delay-and-hold circuit is configured to capture and hold the delayed turn-on signal output by the first RC filter at a steady level, and wherein the second digital delay-and-hold circuit is configured to capture and hold the delayed turn-on signal output by the second RC filter at a steady level.

Example 3. The gate driver circuit of example 1 or 2, wherein: the first digital delay-and-hold circuit comprises a first NOT gate, a second NOT gate, a first NAND gate, a second NAND gate, and an AND gate; an input of the first NOT gate is electrically connected to the output of the first RC filter; an input of the second NOT gate is electrically connected to an output of the first NAND gate; a first input of the AND gate is electrically connected to an output of the first NOT gate; a second input of the AND gate is electrically connected to an output of the second NOT gate; a first input of the first NAND gate is electrically connected to the output of the first RC filter; a second input of the first NAND gate is electrically connected to an output of the second NAND gate; a first input of the second NAND gate is electrically connected to an output of the AND gate; a second input of the second NAND gate is electrically connected to the output of the first NAND gate; and the output of the second NOT gate is configured to output a stabilized version of the delayed turn-on signal output by the first RC filter.

Example 4. The gate driver circuit of example 3, wherein the first digital delay-and-hold circuit comprises a resistor electrically connecting the output of the first RC filter to the output of the second NOT gate.

Example 5. The gate driver circuit of any of examples 1 through 4, wherein: the second digital delay-and-hold circuit comprises a first NOT gate, a second NOT gate, a first NAND gate, a second NAND gate, and an AND gate; an input of the first NOT gate is electrically connected to the output of the second RC filter; an input of the second NOT gate is electrically connected to an output of the first NAND gate; a first input of the AND gate is electrically connected to an output of the first NOT gate; a second input of the AND gate is electrically connected to an output of the second NOT gate; a first input of the first NAND gate is electrically connected to the output of the second RC filter; a second input of the first NAND gate is electrically connected to an output of the second NAND gate; a first input of the second NAND gate is electrically connected to an output of the AND gate; a second input of the second NAND gate is electrically connected to the output of the first NAND gate; and the output of the second NOT gate is configured to output a stabilized version of the delayed turn-on signal output by the second RC filter.

Example 6. The gate driver circuit of example 5, wherein the second digital delay-and-hold circuit comprises a resistor electrically connecting the output of the second RC filter to the output of the second NOT gate.

Example 7. The gate driver circuit of any of examples 1 through 6, further comprising: a first diode having an anode electrically connected to the output of the first RC filter and a cathode electrically connected to the input of the first RC filter; and a second diode having an anode electrically connected to the output of the second RC filter and a cathode electrically connected to the input of the second RC filter.

Example 8. The gate driver circuit of any of examples 1 through 7, further comprising: a first level shifter circuit configured to output a gate signal for a second low-side switch of the synchronous rectifier based on a voltage at a first AC node between a first high-side switch and a first low-side switch of the synchronous rectifier, such that the second low-side switch and the first high-side switch are both on or off at the same time; and a second level shifter circuit configured to output a gate signal for the first low-side switch of the synchronous rectifier based on a voltage at a second AC node between a second high-side switch and the second low-side switch of the synchronous rectifier, such that the first low-side switch and the second high-side switch are both on or off at the same time.

Example 9. The gate driver circuit of example 8, wherein: the first level shifter circuit comprises a first transistor device electrically connected between the first AC node and an input of a first RC filter; a gate of the second low-side switch is electrically connected to an output of the first RC filter; the second level shifter circuit comprises a second transistor device electrically connected between the second AC node and an input of a second RC filter; and a gate of the first low-side switch is electrically connected to an output of the second RC filter.

Example 10. The gate driver circuit of example 9, wherein a gate of the first transistor device and a gate of the second transistor device are electrically connected to a same DC voltage.

Example 11. The gate driver circuit of example 9 or 10, further comprising: a first diode having an anode electrically connected to the output of the first RC filter and a cathode electrically connected to the input of the first RC filter; and a second diode having an anode electrically connected to the output of the second RC filter and a cathode electrically connected to the input of the second RC filter.

Example 12. The gate driver circuit of any of examples 8 through 11, further comprising: a capacitor having a first terminal electrically connected to the first AC node and a second terminal electrically connected to a first end of the coil of the wireless power receiver system, wherein the second AC node is electrically connected to a second end of the coil of the wireless power receiver system.

Example 13. A wireless power receiver system, comprising: a coil configured to conduct a current during inductive power coupling; a synchronous rectifier configured to rectify power received at the coil; and a gate driver circuit configured to control switching of the synchronous rectifier, wherein the gate driver circuit comprises: a first RC filter configured to output a delayed turn-on signal for a first high-side switch of the synchronous rectifier based on a signal input to the first RC filter that indicates a zero-crossing condition for the coil current in a first direction; a second RC filter configured to output a delayed turn-on signal for a second high-side switch of the synchronous rectifier based on a signal input to the second RC filter that indicates a zero-crossing condition for the coil current in a second direction opposite the first direction; a first digital delay-and-hold circuit electrically connected to the output of the first RC filter and configured to stabilize the delayed turn-on signal output by the first RC filter; and a second digital delay-and-hold circuit electrically connected to the output of the second RC filter and configured to stabilize the delayed turn-on signal output by the second RC filter.

Example 14. The wireless power receiver system of example 13, wherein the first digital delay-and-hold circuit is configured to capture and hold the delayed turn-on signal output by the first RC filter at a steady level such that the first high-side switch of the synchronous rectifier remains on during inductive power coupling to the coil at a first polarity, and wherein the second digital delay-and-hold circuit is configured to capture and hold the delayed turn-on signal output by the second RC filter at a steady level such that the second high-side switch of the synchronous rectifier remains on during inductive power coupling to the coil at a second polarity opposite the first polarity.

Example 15. The wireless power receiver system of example 13 or 14, wherein the gate driver circuit comprises: a first diode having an anode electrically connected to the output of the first RC filter and a cathode electrically connected to the input of the first RC filter; and a second diode having an anode electrically connected to the output of the second RC filter and a cathode electrically connected to the input of the second RC filter.

Example 16. The wireless power receiver system of any of examples 13 through 15, wherein the gate driver circuit comprises: a first level shifter circuit configured to output a gate signal for a second low-side switch of the synchronous rectifier based on a voltage at a first AC node between a first high-side switch and a first low-side switch of the synchronous rectifier, such that the second low-side switch and the first high-side switch are both on or off at the same time; and a second level shifter circuit configured to output a gate signal for the first low-side switch of the synchronous rectifier based on a voltage at a second AC node between a second high-side switch and the second low-side switch of the synchronous rectifier, such that the first low-side switch and the second high-side switch are both on or off at the same time.

Example 17. The wireless power receiver system of example 16, wherein: the first level shifter circuit comprises a first transistor device electrically connected between the first AC node and an input of a first RC filter; a gate of the second low-side switch is electrically connected to an output of the first RC filter; the second level shifter circuit comprises a second transistor device electrically connected between the second AC node and an input of a second RC filter; and a gate of the first low-side switch is electrically connected to an output of the second RC filter.

Example 18. The wireless power receiver system of example 17, wherein a gate of the first transistor device and a gate of the second transistor device are electrically connected to a same DC voltage.

Example 19. The wireless power receiver system of example 17 or 18, wherein the gate driver circuit comprises: a first diode having an anode electrically connected to the output of the first RC filter and a cathode electrically connected to the input of the first RC filter; and a second diode having an anode electrically connected to the output of the second RC filter and a cathode electrically connected to the input of the second RC filter.

Example 20. The wireless power receiver system of any of examples 16 through 19, further comprising: a capacitor having a first terminal electrically connected to the first AC node and a second terminal electrically connected to a first end of the coil, wherein the second AC node is electrically connected to a second end of the coil.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A wireless power receiver system, comprising:
   a coil configured to conduct a current during inductive power coupling;
   a synchronous rectifier configured to rectify power received at the coil, wherein the synchronous rectifier comprises a first high-side switch and a first low-side switch electrically connected in series at a first AC node, and a second high-side switch and a second low-side switch electrically connected in series at a second AC node, wherein the coil is electrically connected between the first AC node and the second AC node of the synchronous rectifier; and
   a gate driver circuit configured to control switching of the synchronous rectifier,
   wherein the gate driver circuit comprises:
      a first RC filter configured to output a delayed turn-on signal for the first high-side switch of the synchronous rectifier based on a signal input to the first RC filter that indicates a zero-crossing condition for the coil current in a first direction;
      a second RC filter configured to output a delayed turn-on signal for the second high-side switch of the synchronous rectifier based on a signal input to the second RC filter that indicates a zero-crossing condition for the coil current in a second direction opposite the first direction;
      a first digital delay-and-hold circuit electrically connected between the output of the first RC filter and a gate of the first high-side switch of the synchronous rectifier, the first digital delay-and-hold circuit configured to stabilize the delayed turn-on signal output by the first RC filter; and
      a second digital delay-and-hold circuit electrically connected between the output of the second RC filter and a gate of the second high-side switch of the synchronous rectifier, the second digital delay-and-hold circuit configured to stabilize the delayed turn-on signal output by the second RC filter,
      wherein resistor and capacitor elements of the first RC filter and the second RC filter adjust a deadtime of the synchronous rectifier.

2. The wireless power receiver system of claim 1, wherein:
   the first digital delay-and-hold circuit comprises a first NOT gate, a second NOT gate, a first NAND gate, a second NAND gate, and an AND gate;
   an input of the first NOT gate is electrically connected to the output of the first RC filter;
   an input of the second NOT gate is electrically connected to an output of the first NAND gate;
   a first input of the AND gate is electrically connected to an output of the first NOT gate;
   a second input of the AND gate is electrically connected to an output of the second NOT gate;
   a first input of the first NAND gate is electrically connected to the output of the first RC filter;
   a second input of the first NAND gate is electrically connected to an output of the second NAND gate;
   a first input of the second NAND gate is electrically connected to an output of the AND gate;
   a second input of the second NAND gate is electrically connected to the output of the first NAND gate; and
   the output of the second NOT gate is electrically connected to the gate of the first high-side switch of the synchronous rectifier and configured to output a stabilized version of the delayed turn-on signal output by the first RC filter.

3. The wireless power receiver system of claim 2, wherein the first digital delay-and-hold circuit comprises a resistor electrically connecting the output of the first RC filter to the output of the second NOT gate.

4. The wireless power receiver system of claim 1, wherein:
the second digital delay-and-hold circuit comprises a first NOT gate, a second NOT gate, a first NAND gate, a second NAND gate, and an AND gate;
an input of the first NOT gate is electrically connected to the output of the second RC filter;
an input of the second NOT gate is electrically connected to an output of the first NAND gate;
a first input of the AND gate is electrically connected to an output of the first NOT gate;
a second input of the AND gate is electrically connected to an output of the second NOT gate;
a first input of the first NAND gate is electrically connected to the output of the second RC filter;
a second input of the first NAND gate is electrically connected to an output of the second NAND gate;
a first input of the second NAND gate is electrically connected to an output of the AND gate;
a second input of the second NAND gate is electrically connected to the output of the first NAND gate; and
the output of the second NOT gate is electrically connected to the gate of the second high-side switch of the synchronous rectifier and configured to output a stabilized version of the delayed turn-on signal output by the second RC filter.

5. The wireless power receiver system of claim 4, wherein the second digital delay-and-hold circuit comprises a resistor electrically connecting the output of the second RC filter to the output of the second NOT gate.

6. The wireless power receiver system of claim 1, wherein the first digital delay-and-hold circuit is configured to capture and hold the delayed turn-on signal output by the first RC filter at a steady level such that the first high-side switch of the synchronous rectifier remains on during inductive power coupling to the coil at a first polarity, and wherein the second digital delay-and-hold circuit is configured to capture and hold the delayed turn-on signal output by the second RC filter at a steady level such that the second high-side switch of the synchronous rectifier remains on during inductive power coupling to the coil at a second polarity opposite the first polarity.

7. The wireless power receiver system of claim 1, wherein the gate driver circuit comprises:
a first diode having an anode electrically connected to the output of the first RC filter and a cathode electrically connected to the input of the first RC filter; and
a second diode having an anode electrically connected to the output of the second RC filter and a cathode electrically connected to the input of the second RC filter.

8. The wireless power receiver system of claim 1, wherein the gate driver circuit comprises:
a first level shifter circuit electrically connected to a gate of the second low-side switch of the synchronous rectifier and configured to output a gate signal for the second low-side switch of the synchronous rectifier based on a voltage at the first AC node of the synchronous rectifier, such that the second low-side switch and the first high-side switch are both on or off at the same time; and
a second level shifter circuit electrically connected to a gate of the first low-side switch of the synchronous rectifier and configured to output a gate signal for the first low-side switch of the synchronous rectifier based on a voltage at the second AC node of the synchronous rectifier, such that the first low-side switch and the second high-side switch are both on or off at the same time.

9. The wireless power receiver system of claim 8, wherein:
the first level shifter circuit comprises a first transistor device electrically connected between the first AC node and an input of a first RC filter;
the gate of the second low-side switch is electrically connected to an output of the first RC filter;
the second level shifter circuit comprises a second transistor device electrically connected between the second AC node and an input of a second RC filter; and
the gate of the first low-side switch is electrically connected to an output of the second RC filter.

10. The wireless power receiver system of claim 9, wherein a gate of the first transistor device and a gate of the second transistor device are electrically connected to a same DC voltage.

11. The wireless power receiver system of claim 9, wherein the gate driver circuit comprises:
a first diode having an anode electrically connected to the output of the first RC filter and a cathode electrically connected to the input of the first RC filter; and
a second diode having an anode electrically connected to the output of the second RC filter and a cathode electrically connected to the input of the second RC filter.

12. The wireless power receiver system of claim 8, further comprising:
a capacitor having a first terminal electrically connected to the first AC node and a second terminal electrically connected to a first end of the coil,
wherein the second AC node is electrically connected to a second end of the coil.

13. The wireless power receiver system of claim 1, wherein the resistor and/or capacitor elements of the first RC filter and the second RC filter are programmable to adjust the deadtime of the synchronous rectifier.

* * * * *